United States Patent
Cameli et al.

[15] 3,670,055
[45] June 13, 1972

[54] COMPOSITIONS COMPRISING A MIXTURE OF SULFUR-VULCANIZABLE ETHYLENE/PROPYLENE/DICYCLOPENTADIENE COPOLYMERS WITH SULFUR VULCANIZABLE ETHYLENE/PROPYLENE/BUTADIENE COPOLYMERS

[72] Inventors: Nazzareno Cameli; Paolo Longi; Alberto Valvassori; Umberto Flisi, all of Milan, Italy

[73] Assignee: The B. F. Goodrich Company, Akron, Ohio

[22] Filed: April 1, 1970

[21] Appl. No.: 24,865

[30] Foreign Application Priority Data

April 2, 1969 Italy..................................14983 A/69

[52] U.S. Cl.....................260/889, 260/23.5 A, 260/23.7 M, 260/41.5 R, 260/79.5 B
[51] Int. Cl.......................................C08f 29/12, C08d 9/08
[58] Field of Search..............................260/889, 80.78, 80.7

[56] References Cited

UNITED STATES PATENTS 3,000,866  9/1961  Tarney..................................260/80.5

FOREIGN PATENTS OR APPLICATIONS 978,874  12/1964  Great Britain........................260/80.7

*Primary Examiner*—Samuel H. Blech
*Assistant Examiner*—C. Secairo
*Attorney*—Ernest K. Bean and J. Hughes Powell, Jr.

[57] ABSTRACT

There are disclosed new unsaturated sulfur-vulcanizable compositions comprising mixtures of at least one unsaturated, substantially amorphous, sulfur-vulcanizable copolymer of ethylene, propylene, and dicyclopentadiene with at least one unsaturated, substantially amorphous, sulfur-vulcanizable copolymer of ethylene, propylene and butadiene. The compositions are unsaturated and vulcanizable to elastomers having excellent mechanical and dynamic properties by means of sulfur-containing recipes, at vulcanization rates appreciably higher than can be obtained with the sulfur-vulcanizable copolymers of ethylene, propylene and dicyclopentadiene alone.

5 Claims, No Drawings

COMPOSITIONS COMPRISING A MIXTURE OF SULFUR-VULCANIZABLE ETHYLENE/PROPYLENE/DICYCLOPENTADIENE COPOLYMERS WITH SULFUR VULCANIZABLE ETHYLENE/PROPYLENE/BUTADIENE COPOLYMERS

PRIOR ART

Sulfur-vulcanizable, unsaturated, substantially amorphous co-polymers of ethylene, propylene and dicyclopentadiene are disclosed in Italian patent No. 649,768.

Sulfur-vulcanizable, unsaturated, substantially amorphous copolymers of ethylene, propylene and butadiene are disclosed in Italian Pat. Nos. 566,913; 664,768 and 664,770.

As disclosed in the patents mentioned the copolymers described therein are obtained with the aid of catalysts prepared, preferably, from vanadium compounds and organometallic compounds of aluminum, in the presence or absence of hydrocarbon diluents.

The ethylene/propylene/dicyclopentadiene copolymers have the disadvantage that sulfur-vulcanization thereof by conventional methods occurs at a rate which is not sufficiently high for a practical, commercial process of converting the copolymers to useful elastomers or elastic rubbers. The ethylene/propylene/dicyclopentadiene copolymers require twice the usual vulcanization time and, in the course of time, undergo marked, undesirable variations in their mechanical and dynamic properties owing to the slowness at which the vulcanization reactions proceed.

THE PRESENT INVENTION

One object of this invention was to provide new unsaturated compositions comprising the unsaturated, substantially amorphous, sulfur-vulcanizable copolymers of ethylene, propylene and dicyclopentadiene but having markedly increased sulfur-vulcanization rates.

This and other objects are achieved by the present invention in accordance with which we have found that, surprisingly, the drawback of unduly low vulcanization rate possessed by the unsaturated ethylene, propylene, dicyclopentadiene copolymers can be eliminated by mechanically mixing those copolymers with selected quantities of the unsaturated sulfur-vulcanizable ethylene, propylene, butadiene copolymers mentioned above.

More particularly, it has been found that the mechanical mixtures of the invention, when sulfur-vulcanized by conventional methods, show very high vulcanization rates substantially equal to, for instance, the sulfur-vulcanization rate of ethylene/propylene/butadiene-1,3 copolymers, or of ethylene/propylene/ethylidene-norbornene copolymers.

The copolymers mixed to obtain the present unsaturated, vulcanizable compositions contain, by mols, from 50 to 80 percent of polymerized ethylene units, from 19 to 50 percent of polymerized propylene units, and from 0.1 to 20 percent of polymerized units of the diene, dicyclopentadiene in the case of one of the copolymers of the mixture, and butadiene in the case of the other.

The mixtures can be prepared in any suitable way, such as, for instance, by dissolving the two copolymers to be mixed in a solvent and then precipitating the mixed copolymers thus obtained in a coagulating medium, or by mixing the two copolymers in a calander, in the absence of solvents.

The copolymer mixtures of this invention which have the highest vulcanization rates are obtained when the molar ratio of polymerized butadiene units to polymerized dicyclopentadiene units present in the mixture is comprised between 5:1 and 1:5. However, good vulcanization rates are achieved, also, when the molar ratio of polymerized butadiene units to polymerized dicyclopentadiene units is comprised between 1:10 and 10:1.

By reason of their high vulcanization rates, and the excellent mechanical and dynamic properties of the vulcanized products, which are elastomers or synthetic rubbers, the compositions of the invention have considerable practical value.

As shown below, the properties of the vulcanized products are superior to those of the vulcanizates from the ethylene/propylene/butadiene terpolymers per se.

The following examples are given to illustrate the invention in greater detail and are not intended as limiting.

EXAMPLE 1

In a roller mixer were admixed in a weight ratio of 1:1, two copolymers having the following characteristics:

copolymer A (ethylene-propylene-dicyclopentadiene):
content in propylene = 45 % by weight
content in dicyclopentadiene = 4 % by weight
mooney viscosity = 145
copolymer B (ethylene-propylene-butadiene):
content in propylene = 41% by weight
content in butadiene = 2.5% by weight
mooney viscosity = 98

One hundred parts by weight of this mixture were then admixed to 80 parts of carbon black ISAF, 55 parts of Flexon 766 oil, 1 part of stearic acid, 5 parts of zinc oxide, 0.75 parts of mercaptobenzothiazol, 1.5 parts of tetramethylthiurammonosulphide and 1.75 parts of sulphur. The mix was then vulcanized in a press at 150° C for different vulcanization times.

The properties of the vulcanized products are recorded in Table I.

The ΔT index was determined by means of a Goodrich flexometer, according to ASTM 623 standards (25 minutes at 100° C, stroke 4.445 millimeters, 1,800 cycles per min. load on the specimen 10.01 kg/cm²; diameter of the specimen = 1.78 cm; height of the specimen = 2.54 cm).

TABLE I

| Time in minutes | 15 | 30 | 60 | 90 | 120 | 180 |
|---|---|---|---|---|---|---|
| Tensile strength (Kg/cm²) | 192 | 242 | 252 | 238 | 231 | 237 |
| Elongation at break (in %) | 780 | 710 | 640 | 590 | 580 | 580 |
| Elastic modulus at 200% (Kg/cm²) | 20 | 28 | 34 | 37 | 37 | 38 |
| Elastic modulus at 300% (Kg/cm²) | 40 | 62 | 82 | 79 | 82 | 87 |
| Permanent set, in % | 44 | 30 | 24 | 20 | 20 | 20 |
| Goodrich Δ T (in ° C) | | | | 31 | | |

As appears from the above table, the maximum degree of reticulation (deducible from the values of the elastic modulus) is attained between 60 and 90 minutes of vulcanization.

EXAMPLE 2

The two copolymers A and B, described in example 1, were mixed together in a ratio of 3:1 by weight (A/B = 3) and were then vulcanized with the same mix and under the same conditions of Example 1.

The properties of the vulcanized products have been recorded in Table 2.

TABLE II

| Time in minutes | 15 | 30 | 60 | 90 | 120 | 180 |
|---|---|---|---|---|---|---|
| Tensile strength (in Kg/cm²) | 206 | 236 | 236 | 238 | 247 | 228 |
| Elongation at break (in %) | 860 | 720 | 600 | 540 | 540 | 510 |
| Elastic modulus at 200% (in Kg/cm²) | 19 | 27 | 34 | 48 | 45 | 51 |
| Elastic modulus at 300% (in Kg/cm²) | 36 | 58 | 79 | 102 | 98 | 98 |
| Permanent set (in %) | 48 | 32 | 20 | 18 | 20 | 16 |
| Goodrich Δ T (in ° C) | | | | 26 | | |

As appears from the recorded data, the vulcanization rate is similar to that of mixture A/B = 1 of example 1.

EXAMPLE 3

Table 3 and 4 record the progressive vulcanization rates of, respectively, copolymer A and copolymer B used for the mixes described in Examples 1 and 2.

TABLE III

| Time in minutes | 15 | 30 | 60 | 90 | 120 | 180 |
|---|---|---|---|---|---|---|
| Tensile strength (in Kg/cm$^2$) | 159 | 248 | 237 | 240 | 237 | 235 |
| Elongation at break (in %) | 1000 | 700 | 600 | 540 | 480 | 480 |
| Elastic modulus at 200% (in Kg/cm$^2$) | 13 | 27 | 37 | 45 | 52 | 55 |
| Elastic modulus at 300% (in Kg/cm$^2$) | 22 | 51 | 78 | 91 | 109 | 114 |
| Permanent set (in %) | 66 | 30 | 22 | 14 | 12 | 12 |

TABLE IV

| Time in minutes | 15 | 30 | 60 | 90 | 120 | 180 |
|---|---|---|---|---|---|---|
| Tensile strength (in Kg/cm$^2$) | 171 | 198 | 211 | 210 | 198 | 190 |
| Elongation at break (in %) | 760 | 700 | 660 | 660 | 620 | 630 |
| Elastic modulus at 200% (in Kg/cm$^2$) | 21 | 27 | 32 | 35 | 31 | 30 |
| Elastic modulus at 300% (in Kg/cm$^2$) | 43 | 56 | 64 | 70 | 62 | 58 |
| Permanent set (in %) | 48 | 40 | 38 | 38 | 32 | 32 |
| Goodrich $\Delta$ T, in °C | | | 40 | | | |

From the data given in Table III, it is evident that the vulcanization rate of the terpolymer A (ethylene/propylene/dicyclopentadiene) is lower that that of the mixtures A+B reported in Tables I and II.

As a matter of fact, the table shows that the values of the elastic modulus at 300 percent continue to grow with time and that after 60 minutes the value of the modulus is only 68 percent of the value measured after 180 minutes.

From the data reported in Table IV, it is apparent that the properties of vulcanized products obtained from the terpolymer B (ethylene/propylene/butadiene) are inferior to those of the mixtures of the terpolymers A and B described in examples 1 and 2.

More than one copolymer of ethylene, propylene and dicyclopentadiene having a composition in the ranges stated, may be mixed with more than one copolymer of ethylene, propylene and butadiene having a composition in the range stated, in preparing the present vulcanizable compositions.

The compositions can be converted to manufactured shaped articles of any kind, by known methods simultaneously with, or prior to, vulcanization thereof, to obtained shaped, elastomeric articles having a wide variety of practical uses.

As will be apparent, changes and modifications in details may be made in practicing the invention without departing from the spirit thereof. Therefore, we intend to include in the scope of the appended claims all such modifications as will be obvious to those skilled in the art from the description and working examples given herein.

We claim:

1. Sulfur-vulcanizable unsaturated polymeric compositions comprising (A) a copolymer containing from 50 to 80 percent polymerized ethylene units, from 19 to 50 percent polymerized propylene units and from 0.1 to 20 percent dicyclopentadiene units and (B) a copolymer containing from 50 to 80 percent of polymerized ethylene units, 15 to 19 percent polymerized propylene units and from 0.1 to 20 percent of polymerized butadiene units, containing amounts of (A) and (B) to provide a molar ratio of butadiene units to dicyclopentadiene units between 1:10 and 10:1.

2. A composition of claim 1 wherein the molar ratio of butadiene units to dicyclopentadiene units is between 1.5:5.1.

3. A composition of claim 1 containing as a vulcanizing agent sulfur or sulfur donors.

4. A composition of claim 1 in a vulcanized state.

5. A composition of claim 1 wherein the ratio of (A) to (B) is from about 1:1 to about 3:1.

* * * * *